US010518770B2

(12) United States Patent
Kroop et al.

(10) Patent No.: US 10,518,770 B2
(45) Date of Patent: Dec. 31, 2019

(54) HIERARCHICAL MOTION PLANNING FOR AUTONOMOUS VEHICLES

(71) Applicant: UATC, LLC, San Francisco, CA (US)

(72) Inventors: Benjamin Kroop, Pittsburgh, PA (US); Matthew Way, Pittsburgh, PA (US); David McAllister Bradley, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 42 days.

(21) Appl. No.: 15/458,740

(22) Filed: Mar. 14, 2017

(65) Prior Publication Data

US 2018/0267537 A1 Sep. 20, 2018

(51) Int. Cl.
*G05D 1/00* (2006.01)
*B60W 10/06* (2006.01)
*B60W 10/184* (2012.01)
*B60W 30/10* (2006.01)
*B60W 10/20* (2006.01)

(52) U.S. Cl.
CPC ............ *B60W 30/10* (2013.01); *B60W 10/06* (2013.01); *B60W 10/184* (2013.01); *B60W 10/20* (2013.01); *B60W 2420/42* (2013.01); *B60W 2420/52* (2013.01)

(58) Field of Classification Search
CPC .. G05D 1/0088; G05D 1/0011; G05D 1/0033; G05D 1/0038; G05D 1/0044; B60W 30/08; B60W 30/09; B60W 30/095; B60W 30/0956; B60W 30/14; B60W 30/16; B60W 30/162; B60W 30/165; B60W 30/17; B60W 30/18009; B60W 30/18154; B60W 30/18163
See application file for complete search history.

(56) References Cited

U.S. PATENT DOCUMENTS

| 9,459,108 | B2* | 10/2016 | Berlingerio ........ G01C 21/3423 |
| 10,074,279 | B1* | 9/2018 | Xu ........................ B60W 10/20 |
| 2013/0166134 | A1* | 6/2013 | Shitamoto .............. G05D 1/024 701/26 |
| 2015/0197246 | A1* | 7/2015 | Nagasaka ............. B60W 30/10 701/1 |
| 2017/0008519 | A1* | 1/2017 | Vijayan ................. B60W 30/08 |
| 2017/0008522 | A1* | 1/2017 | Sato ....................... B60W 10/04 |
| 2017/0097640 | A1* | 4/2017 | Wang ..................... G06N 7/005 |
| 2017/0102707 | A1* | 4/2017 | Reichel ............... B60W 30/095 |
| 2017/0108869 | A1* | 4/2017 | Rohde ............... B60W 30/0956 |
| 2017/0166204 | A1* | 6/2017 | Yoo ...................... B60W 30/09 |
| 2017/0248963 | A1* | 8/2017 | Levinson ............... G01C 21/32 |
| 2017/0259816 | A1* | 9/2017 | Takeda .................. B60W 30/16 |

(Continued)

*Primary Examiner* — Thomas G Black
*Assistant Examiner* — Sara J Lewandroski
(74) *Attorney, Agent, or Firm* — Dority & Manning, P.A.

(57) ABSTRACT

An autonomous vehicle can implement a primary motion planner to continuously determine an first motion plan for the AV, and a secondary motion planner to continuously determine a backup motion plan for the AV. The secondary motion planner can comprise one or more cost metrics that act to diverge the backup motion plan from the first motion plan. A control system of the AV may then analyze a live sensor view generated by a sensor suite of the AV to operate acceleration, braking, and steering systems of the AV along sequential route trajectories selected between the first motion plan and the backup motion plan.

14 Claims, 9 Drawing Sheets

(56) References Cited

U.S. PATENT DOCUMENTS

| | | | |
|---|---|---|---|
| 2017/0322041 A1* | 11/2017 | Stephens | G05D 1/0088 |
| 2017/0329338 A1* | 11/2017 | Wei | G05D 1/0088 |
| 2018/0089563 A1* | 3/2018 | Redding | G06N 3/08 |
| 2018/0141545 A1* | 5/2018 | Freytag | B60W 50/0097 |
| 2018/0154899 A1* | 6/2018 | Tiwari | G08G 1/0112 |
| 2018/0220352 A1* | 8/2018 | Hudson | H04B 7/18506 |
| 2018/0370526 A1* | 12/2018 | Ohmura | B60W 30/09 |
| 2019/0061779 A1* | 2/2019 | Mohan | G01C 21/3697 |
| 2019/0146515 A1* | 5/2019 | De Salvo | B60W 30/0953 701/23 |
| 2019/0163191 A1* | 5/2019 | Sorin | G05D 1/0217 |
| 2019/0250001 A1* | 8/2019 | Nakamura | B60W 50/10 |

\* cited by examiner

HIERARCHICAL MOTION PLANNING FOR AUTONOMOUS VEHICLES

BACKGROUND

The advancement of autonomous vehicle (AV) technology involves the safe transition from current programs requiring occasional on-board human intervention and awareness or full autonomy in test environments to enabling safe, fully-autonomous systems with capabilities equal to or greater than human drivers in virtually all driving scenarios. This transition towards "Level 5" autonomy entails the goal of removing human involvement entirely in the operation of the AV in typical and unexpected traffic scenarios on public roads and highways.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
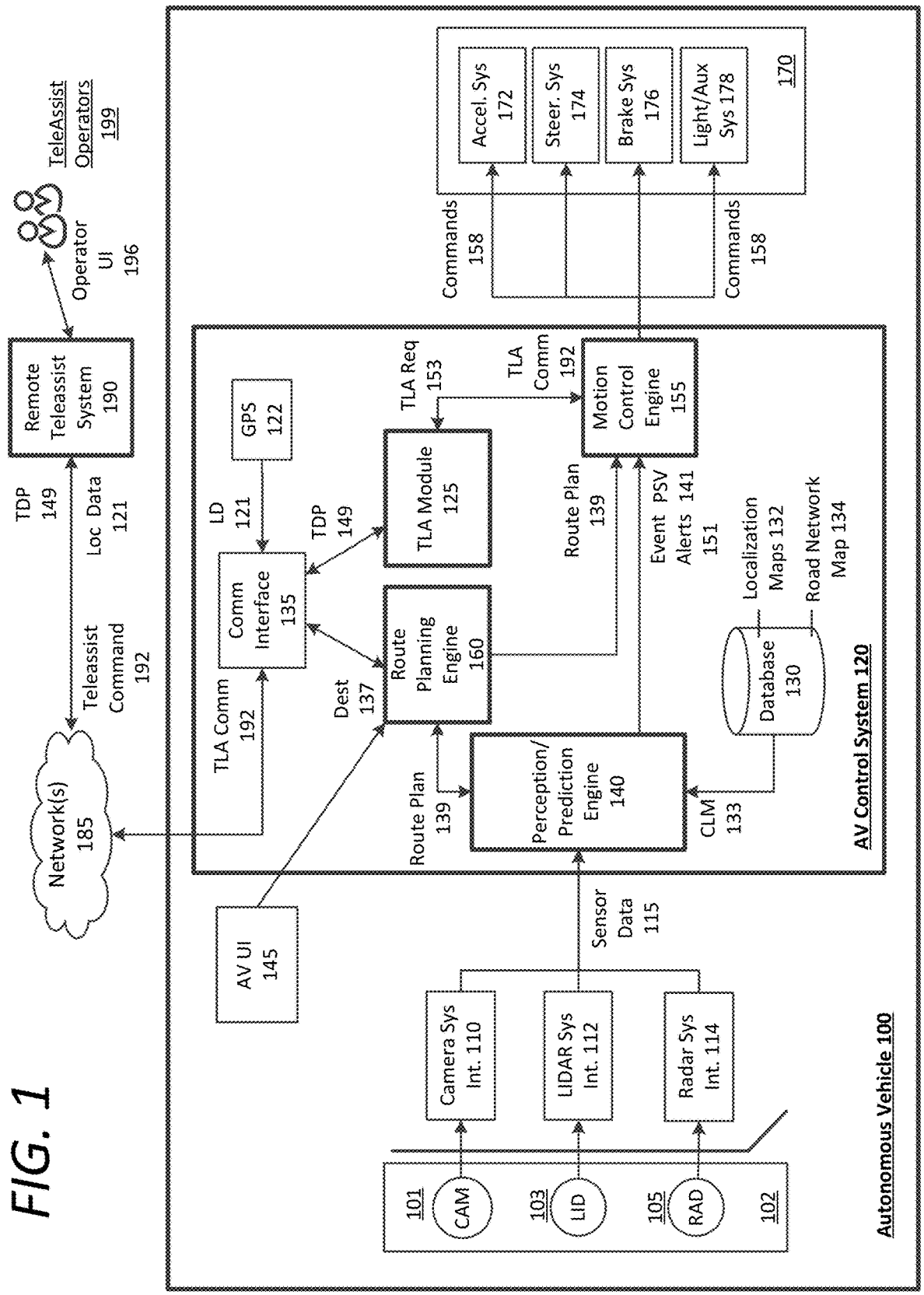
FIG. 1 is a block diagram illustrating an example autonomous vehicle operated by a control system implementing motion control, as described herein.

An autonomous vehicle (AV) can include a sensor suite to generate a live sensor view of a surrounding area of the AV and acceleration, braking, and steering systems autonomously operated by a control system. In various implementations, the control system can dynamically analyze the live sensor view of the surrounding area and a road network map, or highly detailed localization maps, in order to autonomously operate the acceleration, braking, and steering systems along a current route to a destination. On a high level, the current route can be determined by a backend on-demand transportation system, on-board via input of a destination, or a combination of both. Low level routing may be performed by the AV by analyzing the live sensor view in light of a plurality of simultaneously generated motion plans each generating diverging route trajectories, and responding to other vehicles, pedestrians, road conditions, and the like.

According to examples described herein, the control system of the AV can implement a primary motion planner to dynamically determine the most optimal immediate trajectory by analyzing the sensor data in light of a given route plan. In certain examples, the primary motion planner can run "cost-free," such that it always seeks out the most optimal trajectory given the live sensor view and the current route plan towards a given end point or destination. The most optimal trajectory or path can comprise individual lane selections, deviations or detours from the current route, a shortest current distance or a shortest current time (e.g., given live traffic data) to the end point, or an optimization between distance, time, risk, and the like.

In some aspects, the primary motion planner can identify or otherwise determine a teleassistance state on the AV. As provided here in, a teleassistance state can comprise a location or scenario in which the control system of the AV requires remote human assistance to continue along the current route or motion plan of a particular motion planner. For example, the primary motion planner can attempt to traverse along a current optimal trajectory and intersect a road blockage, such as a construction zone, a road closure, etc. In attempting to resolve the road blockage, the primary motion planner may identify a plurality of decision options, such as making a U-turn, selecting an alternative route, or waiting for the road blockage to clear. According to examples described herein, the primary motion planner can leverage teleassistance resources on the AV in order to generate a teleassistance data package for transmission to a remote teleassistance system to enable human operator to decide which of the plurality of decision options to execute.

In various implementations, the AV control system can implement a secondary motion planner to at least partially resolve teleassistance states identified by the primary motion planner. In many aspects, the secondary motion planner can monitor the dynamic trajectory determined by the primary motion planner, and can determine a backup motion plan or trajectory for the AV that differs from the optimal motion plan. For example, the secondary motion planner can be dynamically encoded with a cost function based on the optimal motion plan determined by the primary motion planner. The cost function can essentially place a threshold barrier along the optimal motion plan that forces the secondary motion planner to determine a next most optimal trajectory for the AV. In some aspects, the added cost of continuing along the first priority motion plan can cause the secondary motion planner to generate an alternative trajectory dynamically. However, additionally or alternatively, the secondary motion planner may identify the optimal motion plan to also be the next most optimal motion plan due to the cost threshold for pursuing an alternate trajectory being exceeded.

As provided herein, the AV control system can implement any number of motion planners (e.g., three or four simultaneous motion planners that continuously determine alternative trajectories). Thus, for any given motion planner in a hierarchy of motion planners, a next priority motion planner can provide a next most optimal trajectory for the AV. Accordingly, if the primary motion planner ends up in a teleassistance state, the control system can consult the secondary motion planner. Along these lines, if the secondary motion planner also ends up in a teleassistance state, the control system can consult a tertiary motion planner, and so on, and so forth.

Examples described here in recognize that even with multiple motion planners running simultaneously, the AV control system may still require remote human assistance in certain scenarios. According to examples provided herein, when such an overall teleassistance state exists, the AV control system can generate a teleassistance data package that includes sensor data indicating each possible motion plan or trajectory determined by each of the multiple motion planners, and transmit the teleassistance data package to the remote teleassistance system to enable a human operator to subjectively select a most optimal motion plan or trajectory. As described, the teleassistance data package can provide the human operator with an operator user interface that can simulate the AV executing each of the motion plans determined by each of the multiple motion planners. The operator user interface can enable the human operator to run a simulation of each motion plan in the teleassistance data package. Based on the simulations, the human operator can make s subjective decision in selecting the most optimal motion plan. Upon selecting a motion plan, the remote teleassistance system can generate a teleassistance command executable by the AV control system to implement the selected motion plan.

Among other benefits, the examples described herein achieve a technical effect of providing an additional layer to autonomous vehicle control systems in resolving stuck situations or scenarios. For example, instead of immediately requesting human assistance, the control system can run multiple motion planners that can provide any number of alternative trajectories, routes, maneuvers, or actions. This hierarchy of motion planners can provide the AV control system with a plurality of fallback options in case any motion planner in the hierarchy ends up in a teleassistance state. However, should the AV control system still end up in the teleassist state despite the multiple motion plans determined by the implemented motion planners, the AV control system can still leverage human cognition in making an ultimate selection by generating and transmitting a teleassistance data package to a remote teleassistance system.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the term "autonomous vehicle" (AV) describes any vehicle operating in a state of autonomous control with respect to acceleration, steering, braking, auxiliary controls (e.g., lights and directional signaling), and the like. Different levels of autonomy may exist with respect to AVs. For example, some vehicles may enable autonomous control in limited scenarios, such as on highways. More advanced AVs, such as those described herein, can operate in a variety of traffic environments without any human assistance. Accordingly, an "AV control system" can process sensor data from the AV's sensor array, and modulate acceleration, steering, and braking inputs to safely drive the AV along a given route.

System Description

FIG. 1 is a block diagram illustrating an example AV operated by a control system implementing a teleassistance module, as described herein. In an example of FIG. 1, a control system 120 can autonomously operate the AV 100 in a given geographic region for a variety of purposes, including transport services (e.g., transport of humans, delivery services, etc.). In examples described, the AV 100 can operate without human control. For example, the AV 100 can autonomously steer, accelerate, shift, brake, and operate lighting components. Some variations also recognize that the AV 100 can switch between an autonomous mode, in which the AV control system 120 autonomously operates the AV 100, and a manual mode in which a driver takes over manual control of the acceleration system 172, steering system 174, braking system 176, and lighting and auxiliary systems 178 (e.g., directional signals and headlights).

According to some examples, the control system 120 can utilize specific sensor resources in order to autonomously operate the AV 100 in a variety of driving environments and conditions. For example, the control system 120 can operate the AV 100 by autonomously operating the steering, acceleration, and braking systems 172, 174, 176 of the AV 100 to a specified destination 137. The control system 120 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 120 includes computational resources (e.g., processing cores and/or field programmable gate arrays (FPGAs)) which operate to process sensor data 115 received from a sensor system 102 of the AV 100 that provides a sensor view of a road segment upon which the AV 100 operates. The sensor data 115 can be used to determine actions which are to be performed by the AV 100 in order for the AV 100 to continue on a route to the destination 137. In some variations, the control system 120 can include other functionality, such as wireless communication capabilities using a communication interface 135, to send and/or receive wireless communications over one or more networks 185 with one or more remote sources. In controlling the AV 100, the control system 120 can generate commands 158 to control the various control mechanisms 170 of the AV 100, including the vehicle's acceleration system 172, steering system 157, braking system 176, and auxiliary systems 178 (e.g., lights and directional signals).

The AV 100 can be equipped with multiple types of sensors 102 which can combine to provide a computerized perception, or sensor view, of the space and the physical environment surrounding the AV 100. Likewise, the control system 120 can operate within the AV 100 to receive sensor data 115 from the sensor suite 102 and to control the various control mechanisms 170 in order to autonomously operate the AV 100. For example, the control system 120 can analyze the sensor data 115 to generate low level commands 158 executable by the acceleration system 172, steering system 157, and braking system 176 of the AV 100. Execution of the commands 158 by the control mechanisms 170 can result in throttle inputs, braking inputs, and steering inputs that collectively cause the AV 100 to operate along sequential road segments to a particular destination 137.

In more detail, the sensor suite 102 operates to collectively obtain a live sensor view for the AV 100 (e.g., in a forward operational direction, or providing a 360 degree sensor view), and to further obtain situational information proximate to the AV 100, including any potential hazards or obstacles. By way of example, the sensors 102 can include multiple sets of camera systems 101 (video cameras, stereoscopic cameras or depth perception cameras, long range monocular cameras), LIDAR systems 103, one or more radar systems 105, and various other sensor resources such as sonar, proximity sensors, infrared sensors, and the like. According to examples provided herein, the sensors 102 can be arranged or grouped in a sensor system or array (e.g., in a sensor pod mounted to the roof of the AV 100) comprising any number of LIDAR, radar, monocular camera, stereoscopic camera, sonar, infrared, or other active or passive sensor systems.

Each of the sensors 102 can communicate with the control system 120 utilizing a corresponding sensor interface 110, 112, 114. Each of the sensor interfaces 110, 112, 114 can include, for example, hardware and/or other logical components which are coupled or otherwise provided with the respective sensor. For example, the sensors 102 can include a video camera and/or stereoscopic camera system 101 which continually generates image data of the physical environment of the AV 100. The camera system 101 can provide the image data for the control system 120 via a camera system interface 110. Likewise, the LIDAR system 103 can provide LIDAR data to the control system 120 via a LIDAR system interface 112. Furthermore, as provided herein, radar data from the radar system 105 of the AV 100 can be provided to the control system 120 via a radar system interface 114. In some examples, the sensor interfaces 110, 112, 114 can include dedicated processing resources, such as provided with field programmable gate arrays (FPGAs) which can, for example, receive and/or preprocess raw image data from the camera sensor.

In general, the sensor systems 102 collectively provide sensor data 115 to a perception/prediction engine 140 of the control system 120. The perception/prediction engine 140 can access a database 130 comprising stored localization maps 132 of the given region in which the AV 100 operates. The localization maps 132 can comprise highly detailed ground truth data of each road segment of the given region. For example, the localization maps 132 can comprise pre-recorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 100 travels along a given route, the perception/prediction engine 140 can access a current localization map 133 of a current road segment to compare the details of the current localization map 133 with the sensor data 115 in order to detect and classify any objects of interest, such as moving vehicles, pedestrians, bicyclists, and the like.

In various examples, the perception/prediction engine 140 can dynamically compare the live sensor data 115 from the AV's sensor systems 102 to the current localization map 133 as the AV 100 travels through a corresponding road segment. The perception/prediction engine 140 can flag or otherwise identify any objects of interest in the live sensor data 115 that can indicate a potential hazard. In accordance with many examples, the perception/prediction engine 140 can output a processed sensor view 141 indicating such objects of interest to a motion control engine 155 of the AV 100. In further examples, the perception/prediction engine 140 can predict a path of each object of interest and determine whether the AV control system 120 should respond or react accordingly. For example, the perception/prediction engine 140 can dynamically calculate a collision probability for each object of interest, and generate event alerts 151 if the collision probability exceeds a certain threshold. As described herein, such event alerts 151 can be processed by the motion control engine 155 that generates control commands 158 executable by the various control mechanisms 170 of the AV 100, such as the AV's acceleration, steering, and braking systems 172, 174, 176.

On a higher level, the AV control system 120 can include a route planning engine 160 that provides the motion control engine 155 with a route plan 139 to a destination 137. The destination 137 can be inputted by a passenger via an AV user interface 145, or can be received over one or more networks 185 from a backend transportation management system (e.g., that manages and on-demand transportation service). In some aspects, the route planning engine 160 can determine a most optimal route plan 139 based on a current location of the AV 100 and the destination 137. In various aspects, the perception/prediction engine 140 can analyze the live sensor data 115 and the current localization map 133 with a focus on the route plan 139. Additionally or alternatively, the route planning engine 160 can provide the route plan 139 to the motion control engine 155 to enable the motion control engine 155 to execute a number of motion planners that each determines an immediate trajectory or action to be performed by the AV 100.

As provided herein, the motion control engine 155 can directly control the control mechanisms 170 of the AV 100 by analyzing the processed sensor view 141 in light of the route plan 139 and in response to any event alerts 151. Thus, the motion control engine 155 can generate control commands 158 executable by each of the AV's 100 control mechanisms 170 to modulate, for example, acceleration, braking, and steering inputs in order to progress the AV 100 along the current route plan 139. Detailed description of the functions of the multiple planners implemented by the motion control engine 155 is provided below with respect to FIG. 2.

According to examples described herein, as the motion control engine 155 progresses the AV 100 along sequential route trajectories of the current route plan 139, certain scenarios may occur in which the motion control engine 155 is unable to continue or requires remote human assistance. Such scenarios can include road blockages, such as road construction zones, road closures, nonfunctioning traffic signals, environmental damage, mass pedestrian events, and the like. Such scenarios can further include indeterminate objects in which the perception/prediction engine 140 is unable to classify a detected object in the sensor data 115. Examples described herein recognize that that's the scenarios can further include situations in which a safety threshold is not met, such as when an occlusion is present in the sensor data 115, when processing resources of the AV 100 are overloaded, or in extreme circumstances, like severely crowded areas for complex intersections.

In various examples, the motion control engine 155 can mitigate such "stuck" states or "teleassistance" states by implementing multiple motion planners simultaneously. As described herein, a primary motion planner may function to continuously determine an optimal motion plan along the current route plan 139. The motion control engine 155 can further implement a secondary motion planner that can continuously determine a backup motion plan such that when the optimal motion plan results in a stuck state, the motion control engine 155 can execute the backup motion plan. Any number of motion planners can be executed simultaneously by the motion control engine 155 such that the motion control engine 155 as multiple backup options to any given current motion plan.

As provided herein, a "motion plan" can correspond to an immediate trajectory or path that guides the AV 100 along the current route plan 139. A "motion planner" can correspond to a programmatic module that continuously processes the sensor view 141 in light of the route plan 139 to determine a motion plan. In order to ensure that each motion planner implemented by the motion control engine 155 determines a different motion plan, the motion control engine 155 can execute a hierarchy of motion planners that have distinct cost metrics that diverge a given motion plan from the other motion plans. For example, the motion control engine 155 can implement a priority motion planner that continuously determines the optimal trajectory or motion plan for the AV 100. This optimal trajectory can follow the route plan 139 to the destination 137 along select lanes, and making turns that progress the AV 100 to the destination 137 in a most optimal manner, such as by minimizing distance or time. Examples described here in recognize that deviations from the most optimal trajectory or motion plan can be relatively rare. However, anomalous events, indeterminate objects, road blockages, and the like, can occasionally cause the priority motion planner to enter a teleassistance state. In one aspect, the motion control engine 155 can generate a teleassist request 153 and transmit the teleassist request 153 to a teleassistance module 125 of the control system 120.

The teleassistance module 125 can process the teleassist request 153 by generating a teleassistance data package 149 that can include data enabling a human teleassist operator 199 to select one of a plurality of decision options for the AV 100. In various implementations, the teleassist module 125 can compile the plurality of decision options from the motion planners implemented by the motion control engine 155. The teleassist data package 149 can include connection data enabling a remote teleassist system 192 access live image and video streams from the AV's 100 camera systems 101. Thus, the teleassist module 125 can initiate the connection with the remote teleassist system 190 over the one or more networks 185, transmit the teleassist data package 149 to the remote teleassist system 190.

In many examples, the teleassist data package 149 can also include telemetry data, diagnostics data for the AV 100, and/or location data 121 from a location-based resource of the AV 100 (e.g., a GPS module 122). Accordingly, teleassist data package 149 can provide human teleassist operator 199 with context in order to make a selection of the AV's 100 next immediate action. In variations, based on the contextual information provided by the teleassist data package 149, the remote teleassist system 190 can generate a plurality of decision options independently and present the decision options to the teleassist operator 199 on an operator user interface 196. The operator user interface 196 can present, on a display screen of the teleassist operators 199 computing device, each of the decision options to be capable of quick and easy review and selection.

After the teleassist operator 199 makes a selection on the operator user interface 196, the remote teleassist system 190 can generate a teleassist command 192 and transmit the teleassist command 192 back to the communication interface 135 of the AV 100 over the one or more networks 185. The teleassist command 192 can instruct the AV control system 120 to execute the selected decision options by teleassist operator 199. Thus, the teleassist command 192 can be processed by the motion control engine 155 to execute the selected decision option by generating a set of control commands 158 to modulate acceleration, braking, and steering inputs accordingly. As provided herein, the teleassist command 192 can instruct the motion control engine 155 to follow a selected route, perform a maneuver (e.g., a U-turn, swerve), ignore an object, wait, perform an action (e.g., sound the horn, display intention, nudge forward), etc.

According to examples described herein, communications with the remote teleassist system 190 can comprise a last resort after each motion planner implemented on motion control engine 155 enters a teleassistance state requiring human assistance. It is contemplated that such communications with the remote teleassist system 190 can become progressively rarer as AV technology and intelligence continues to advance. Accordingly, the advancement of current AV technology towards level 5 autonomy can be bridged by providing the remote human assistance layer described herein. Further contemplated herein to provide an additional layer for the progression towards full autonomy is a hierarchy of motion planners implemented by the motion control engine 155 described below with respect to FIG. 2.

Figure 2:
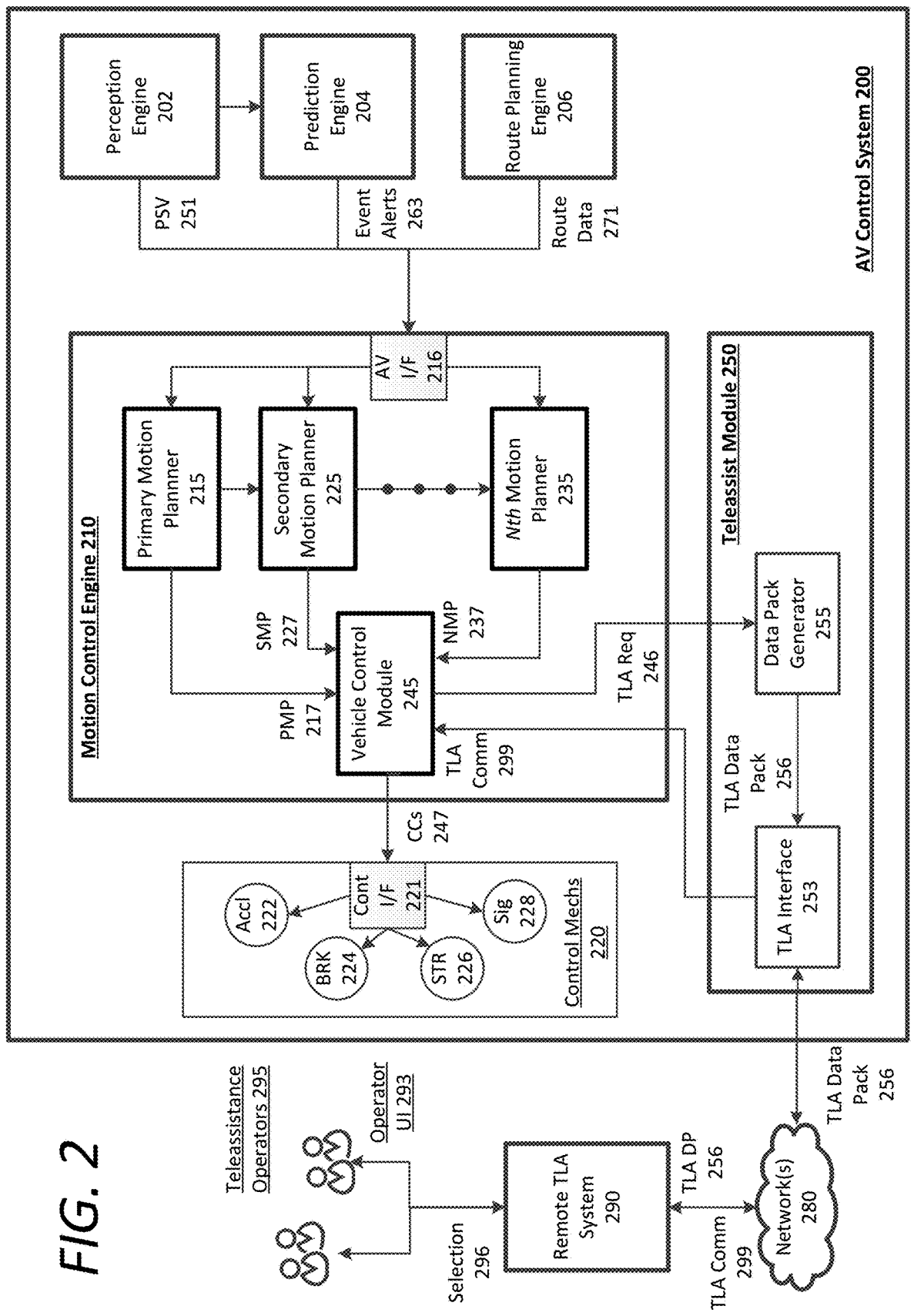
FIG. 2 is a block diagram illustrating an example AV control system implementing a hierarchical motion control engine, according to examples described herein.

FIG. 2 is a block diagram illustrating an example AV control system implementing a hierarchical motion control engine, according to examples described herein. In the below discussion of FIG. 2, the AV control system 200 can comprise the AV control system 120 of FIG. 1. Thus, the AV control system 200 can include perception engine 202, a prediction engine 204, and a route planning engine 206. As described, the perception engine 202 can generate a processed sensor view 251 indicating each identified object of interest and its classification (e.g., a pedestrian, a bicyclist, a static vehicle, a vehicle in motion, and the like). The prediction engine 204 can further analyze the processed sensor view 251 to predict the paths or trajectories of each object of interest in order to generate event alerts 263. As described herein, the event alerts 263 can provide a warning to the motion control engine 210 when a collision probability for a particular object of interest exceeds a certain threshold.

Given a destination, the route planning engine 206 can generate route data 271 indicating a most optimal route from the AV's current location to the destination. In some aspects, the route planning engine 206 can access the remote resource, such as a mapping service, to determine the most optimal route. Additionally or alternatively, the route planning engine 206 can determine the most optimal route by analyzing live traffic data in order to optimize distance and/or time to the destination. The processed sensor view 251, the event alerts 263, and/or the route data 271 can be provided to an AV interface 216 of the motion control engine 210. In general, the motion control engine 210 can implement a primary motion planner 215 that dynamically analyzes the process sensor view 251 in order to determine most optimal trajectory, or priority motion plan 217, as distinguished from the overall route plan. This trajectory can comprise granular actions to be performed by the AV, such as low level lane selections, turns, avoidance maneuvers, selecting alternative routes, and the like. Accordingly, by default, the motion control engine 210 can follow sequential route trajectories determined by the primary motion planner 215.

In some aspects, when the primary motion planner 215 enters a teleassistance state, the primary motion planner 215 can cause a vehicle control module 245 of the motion control engine 210 to generate a teleassistance request 246. The teleassistance request can be processed by a teleassist module 250 of the AV control system 200. In these examples, the teleassist module 250 can provide binary selection options (e.g., requesting a yes or no answer from a human teleassistance operator 295) for the priority motion plan 217. The teleassistance state by the primary motion planner 215 can correspond to a stuck situation, such as a safety threshold not being met. Upon transmitting a teleassistance request 246, the primary motion planner 215 can determine a new binary selection option for the remote human operator 295 (e.g., in case the human operator selects "no" for the previous option). Accordingly, for such a binary implementation, the primary motion planner 215 can continuously provide backup selection options to prevent delays in case of "no" selections.

In variations, the motion control engine 210 can execute a plurality of motion planners simultaneously. For example, motion control engine 210 can execute the primary motion planner 215 to continuously determine the most optimal motion plan 217, and a secondary motion planner 225 to continuously determine a secondary motion plan 227. The secondary motion plan 227 can, at any given time, diverge from the priority motion plan 217 determined by the primary motion planner 215. To ensure that the secondary motion plan 227 diverges from the priority motion plan 217, the secondary motion planner 225 can receive as input data indicating the priority motion plan 217, and set one or more cost metrics that essentially blocks the secondary motion planner 225 from determining the same motion plan as the primary motion planner 215. For example, the priority motion plan 217 can instruct vehicle control module 245 generate control commands 247 executable by the control mechanisms 220 (i.e., the AV's acceleration system 222, braking system 224, steering system 226, and signalizing systems 228) to perform a lane change to execute an upcoming turn. At the same time, the secondary motion planner 225 can establish a certain cost for the lane change and/or the upcoming turn that causes the secondary motion planner 225 to determine a different motion plan (i.e., the secondary motion plan 227 going straight through the upcoming intersection).

Thus, the motion control engine 210 can operate the AV autonomously by selecting sequential route trajectories determined by both the primary and secondary motion planners 215, 225. In certain implementations, the second motion planner 225 can dynamically adjust the one or more cost metrics by continuously identifying an upcoming route trajectory of the optimal motion plan 217, and establishing a cost for the backup motion plan 227 to follow the upcoming route trajectory of the optimal motion plan 217. This can cause the backup motion plan 227 to consistently diverge from the trajectory of the optimal motion plan 217. In various examples, the cost can comprise a threshold below which the secondary motion planner 225 will determine the backup motion plan 227 to be different from the optimal motion plan 217, and above which the backup motion plan 227 and the optimal motion plan 217 will be the same.

As such, the cost can be finite such that on occasion, the secondary motion planner 225 can determine the same motion plan as the priority motion plan 217. For example, if the AV travels along a straight rural road and encounters a road construction zone, the priority motion plan 217 can instruct the vehicle control module 245 to slow down and continue along the current path. The secondary motion planner 225 can set a certain cost for continuing along the current path, the objective cost of executing an alternative trajectory for motion plan can still be higher. In such a scenario, the secondary motion plan 227 can match the priority motion plan 217.

In certain implementations, the secondary motion planner 225 can generate the secondary motion plan 227 continuously as a backup plan to the priority motion plan 217. The threshold causes the vehicle control module 245 to execute the secondary motion plan 227 instead of the priority motion plan 217 can correspond to the primary motion planner 215 entering a teleassistance state. That is, if the primary motion planner 215 enters a stuck state respected priority motion plan 217 (e.g., a certainty threshold or safety threshold has not been met), the vehicle control module 245 can execute the secondary motion plan 227. Execution of the secondary motion plan 227 can be performed by the vehicle control module 245 one or more actions or maneuvers before reverting back to the priority motion plan 217. It is to be understood that the primary motion planner 215 determines the priority motion plan 217 dynamically, such that the current state or situation of the AV is accounted for to determine the most optimal trajectory. Thus, given an override the priority motion plan 217, the execution of the secondary motion plan 227, primary motion planner 215 can "reset" to determine the new priority motion plan 217, which the vehicle control module 245 can execute once the primary motion planner 215 has exited its teleassistance state.

In executing a given motion plan, the vehicle control module 245 can generate control commands 247 executable by the individual control mechanisms 220 of the AV. The control mechanisms 220 can include a control interface 221 that receives the control commands 247 from the vehicle control module 245. Based on each individual control command 247, the control interface 221 can transmit the control command 247 to the relevant control mechanism 220 (i.e., the acceleration system 222, braking system 224, steering system 226, or signaling system 220). Execution of the control commands 247 can cause the AV to accelerate, brake, turn or steer, and signal intent in accordance with the current motion plan executed by the vehicle control module 245 (e.g., the priority motion plan 217 or the secondary motion plan 227). Accordingly, the vehicle control module 245 can autonomously operate the AV to the destination by executing the low level motion plans determined by primary motion planner 215 and the secondary motion planner 225 given the high level route data 271 determined by the route planning and 206.

In various examples, the motion control engine 210 can be programmed to minimize or eliminate teleassistance requests 246 that require remote human assistance. In doing so, motion control engine 210 can implement a hierarchy of motion planners as shown in the example of FIG. 2. Accordingly, motion control engine 210 can implement any number of individual motion planners in a hierarchy such that any subsequent motion planner establishes a set of cost metrics to diverge its motion plan from all previous motion planners in the hierarchy. As shown in FIG. 2, in addition to the primary motion planner 215 and the secondary motion planner 225, the motion control engine 210 can implement a tertiary motion planner, a quaternary motion planner, a quinary motion planner, etc., up to an arbitrary Nth motion planner 235.

Utilizing such a hierarchy, the motion control engine 210 can determine N simultaneous motion plans at any given time. Thus, the Nth motion planner 235 can provide an Nth motion plan 237 to the vehicle control module 245, which can be executed when all previous motion planners in the hierarchy are in a teleassistance state. For example, the priority motion plan 217 can encounter an occlusion in the sensor view (e.g., a parked truck) preventing the vehicle control module 245 from safely proceeding. Thus, the vehicle control module 245 can attempt to execute the secondary motion plan 227, which can also encounter a teleassistance state. For example, the secondary motion plan 227 can correspond to a left turn, but the opposite lane traffic can be dense and create an unacceptable hazard. Thus, the vehicle control module 245 can continue to attempt to execute subsequent motion plans until a viable motion plan in the hierarchy is not in a teleassistance state, which allows the vehicle control module 245 to actually execute the viable motion plan. Thereafter, each motion planner in the hierarchy can reset based on the new conditions of the AV.

In certain rare circumstances, it is contemplated that even the Nth motion plan 237 can be comprised in a teleassistance state. For example, some unforeseeable event may take place, such as a landslide, an extreme weather event (e.g., a tornado, a hurricane, a snow storm or dust storm, a flash flood, etc.), an earthquake, an icy road, a car accident, and the like. Such events or conditions can cause each motion planner of the motion control engine 210 to seek remote human assistance. The vehicle control module 245 may then generate a teleassistance request 246, and transmit the teleassistance request 246 to the teleassist module 250 of the AV control system 200.

The teleassist module 250 can include a data pack generator 255 that generates a teleassistance data pack 256 that can provide the human teleassistance operator 295 with contextual information corresponding to the AV's current situation. The teleassistance module 250 can include the teleassist interface 253 that can initiate connection with a remote teleassist and system 290 over one or more networks 280. As provided herein, the teleassistance data pack 256 can include image or video data from the sensor systems of the AV, telemetry and or diagnostics data, location data, and the like. The teleassistance interface 253 can transmit the teleassistance data pack 256 to the remote teleassist and system 290 over the one or more networks 280. In one example, the teleassistance data pack 256 can comprise the optimal motion plan 217 and the backup motion plan 227, and the remote human operator 295 can make a selection 296 from the two.

As further described herein, the remote teleassistance system 290 an process the teleassistance data pack 256 by generating an operator user interface 293 comprising a plurality of options executable by the AV control system 200. The operator user interface 293 can further enable the human teleassistance operator 295 to scroll through options, select video feeds from individual cameras on the AV, and visualize a simulation of the AV executing each decision option in a virtual space generated using the live sensor view of the AV. Accordingly, the remote teleassistance system 290 can execute a virtual simulation instruction set that causes the teleassistance system 290 to generate a virtual simulation of the AV executing each decision option (e.g., corresponding to the motion plans 217, 227, 237, and/or additional plans determined by the remote teleassistance system 290). The human teleassistance operator 295 may then select a dedicated virtualization feature on the operator user interface 293 that causes the execution of a corresponding decision option to be simulated.

The teleassistance operator 295 can have the option of viewing each of the simulations, or can select a particular option without viewing its simulation. Once the teleassistance operator 295 makes a selection 296, the remote teleassistance system 290 can generate a teleassistance command 299 that instructs the motion control engine 210 to execute the selected option (e.g., one of the motion plans 217, 227, 237). The remote teleassistance system 290 can transmit the teleassistance command 299 back to the teleassistance interface 253 of the teleassist module 250, which can relay or otherwise transmit the teleassistance command 299 to the vehicle control module 245. The vehicle control module 245 may then execute the teleassistance command 299 by generating a corresponding set of control commands 247 executable by the control mechanisms 220 of the AV. Thereafter, the motion control engine 210 can continue implementing the hierarchy of motion planners, executing the priority motion plan 217 by default.

Should the execution of a particular motion plan or teleassistance command cause the vehicle control module 245 to operate the AV along an alternative route, the route planning engine 206 can update the most optimal route. The primary motion planner 215 may then execute to continuously determine the most optimal trajectory, or priority motion plan 217, the secondary motion planner 225 can continuously determine the secondary motion plan 227, and onwards down the hierarchy to the Nth motion planner 235.

Autonomous Vehicle in Operation

Figure 3:
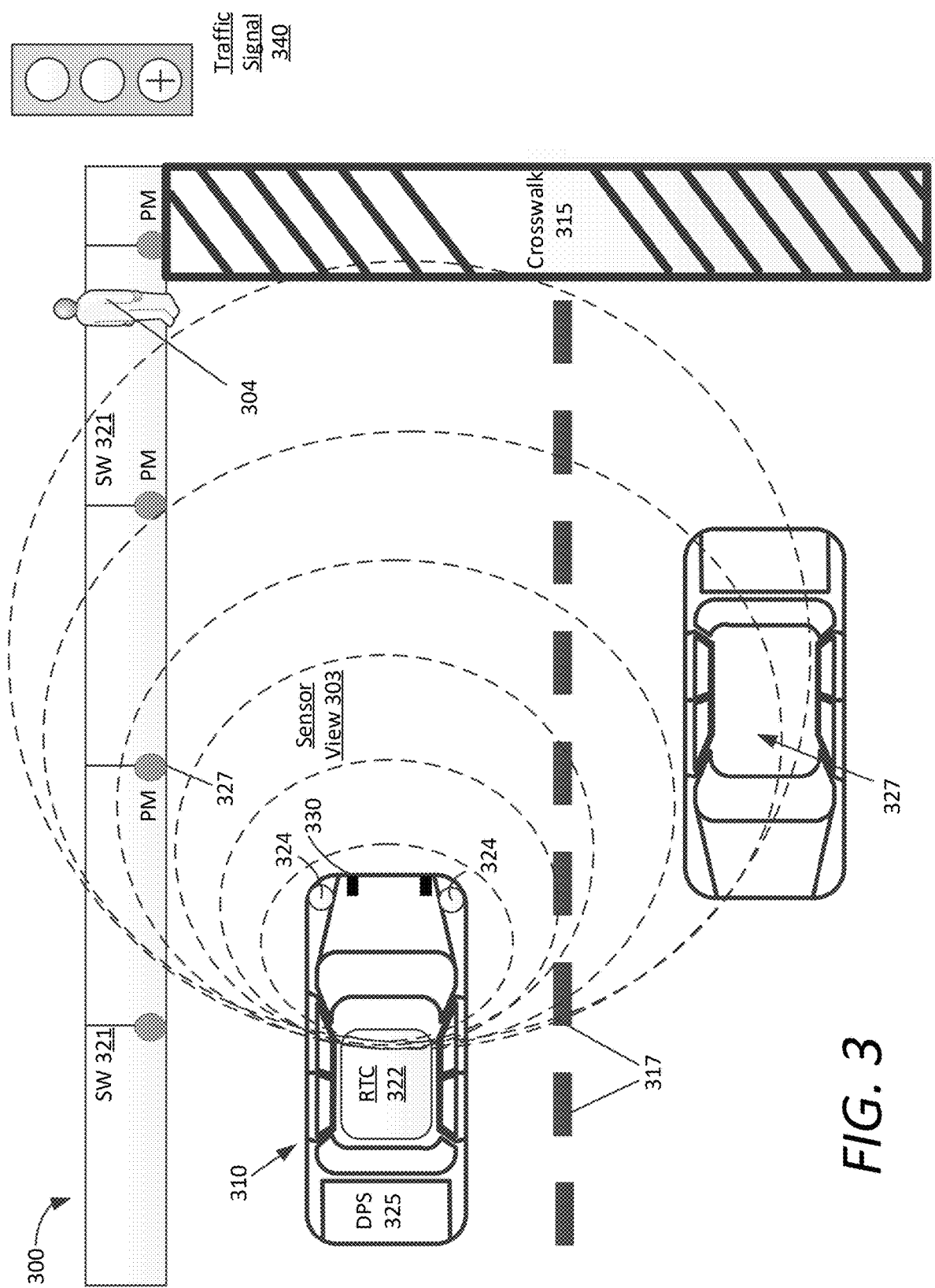
FIG. 3 shows an example of an autonomous vehicle utilizing sensor data to navigate an environment in accordance with example implementations.

FIG. 3 shows an example of an AV utilizing sensor data to navigate an environment in accordance with example implementations. In an example of FIG. 3, the autonomous vehicle 310 may include various sensors, such as a roof-top camera array (RTC) 322, forward-facing cameras 324 and laser rangefinders 330. In some aspects, a data processing system 325, comprising a computer stack that includes a combination of one or more processors, FPGAs, and/or memory units, can be positioned in the cargo space of the vehicle 310.

According to an example, the vehicle 310 uses one or more sensor views 303 (e.g., a stereoscopic or 3D image of the environment 300) to scan a road segment on which the vehicle 310 traverses. The vehicle 310 can process image data or sensor data, corresponding to the sensor views 303 from one or more sensors in order to detect objects that are, or may potentially be, in the path of the vehicle 310. In an example shown, the detected objects include a pedestrian 304 and another vehicle 327—each of which may potentially cross into a road segment along which the vehicle 310 traverses. The vehicle 310 can use information about the road segment and/or image data from the sensor views 303 to determine that the road segment includes a divider 317 and an opposite lane, as well as a sidewalk (SW) 321, and sidewalk structures such as parking meters (PM) 327.

The vehicle 310 may determine the location, size, and/or distance of objects in the environment 300 based on the sensor view 303. For example, the sensor views 303 may be 3D sensor images that combine sensor data from the roof-top camera array 322, front-facing cameras 324, and/or laser rangefinders 330. Accordingly, the vehicle 310 may accurately detect the presence of objects in the environment 300, allowing the vehicle 310 to safely navigate the route while avoiding collisions with other objects.

According to examples, the vehicle 310 may determine a probability that one or more objects in the environment 300 will interfere or collide with the vehicle 310 along the vehicle's current path or route. In some aspects, the vehicle 310 may selectively perform an avoidance action based on the probability of collision. The avoidance actions may include velocity adjustments, lane aversion, roadway aversion (e.g., change lanes or drive further from the curb), light or horn actions, and other actions. In some aspects, the avoidance action may run counter to certain driving conventions and/or rules (e.g., allowing the vehicle 310 to drive across center line to create space for bicyclist).

The AV 310 can further detect certain road features that can increase the vehicle's alertness, such as a crosswalk 315 and a traffic signal 340. In the example shown in FIG. 3, the AV 310 can identify certain factors that can cause the vehicle 310 to enter a high alert state, such as the pedestrian 304 being proximate to the crosswalk 315. Furthermore, the AV 310 can identify the signal state of the traffic signal 340 (e.g., green) to determine acceleration and/or braking inputs as the AV 310 approaches the intersection. At any given time, the AV 310 can enter a teleassistance statesuch as identifying an indeterminate object or an issue with a sensor—and query a backend teleassistance system to resolve the issue.

According to examples described herein, the AV 310 can execute a hierarchy of a plurality of motion planners that enables the AV 310 to have at least one backup plan or trajectory if the most optimal or priority motion plan results in a teleassistance state. As a last resort, the AV 310 may request remote teleassistance when, for example, each of the motion planners enter a teleassistance state. In the example shown in FIG. 3, the AV 310 may identify that the orientation of the pedestrian 304 may result in a collision, which can cause the priority motion plan (i.e., going straight through the intersection) to fail. The secondary motion plan (e.g., turning right at the intersection) may also fail do to the pedestrian 304, causing the AV 310 to stop and request human assistance. In doing so, the AV 310 can generate a set of decision options to enable a remote, human operator to select from. A selected decision from the generated set may then be executed by the AV 310 in proceeding. In the example of FIG. 3, the AV 310 may generate a set of decision options that include stopping and waiting until the pedestrian 304 passes, ignoring the pedestrian 304, slowing and proceeding with caution, sounding the horn, or any combination of the foregoing. In response, the human teleassistance operator may select "slow and proceed with caution," allowing the AV 310 to proceed accordingly and with an added layer of confidence.

Figure 4A:
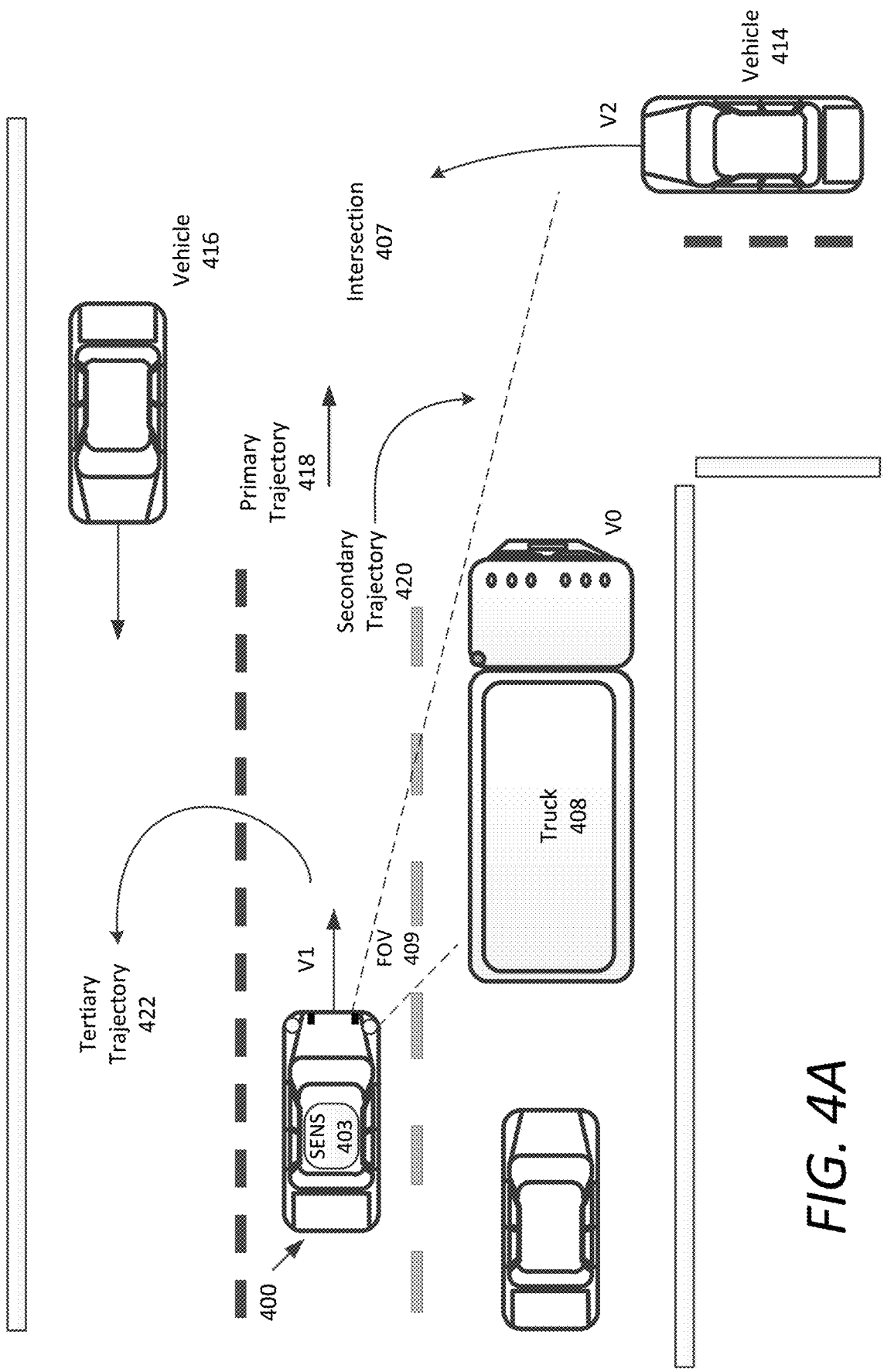
FIGS. 4A and 4B show an example autonomous vehicle initiating teleassistance after running a motion planning hierarchy, in accordance with example implementations.
Figure 4B:
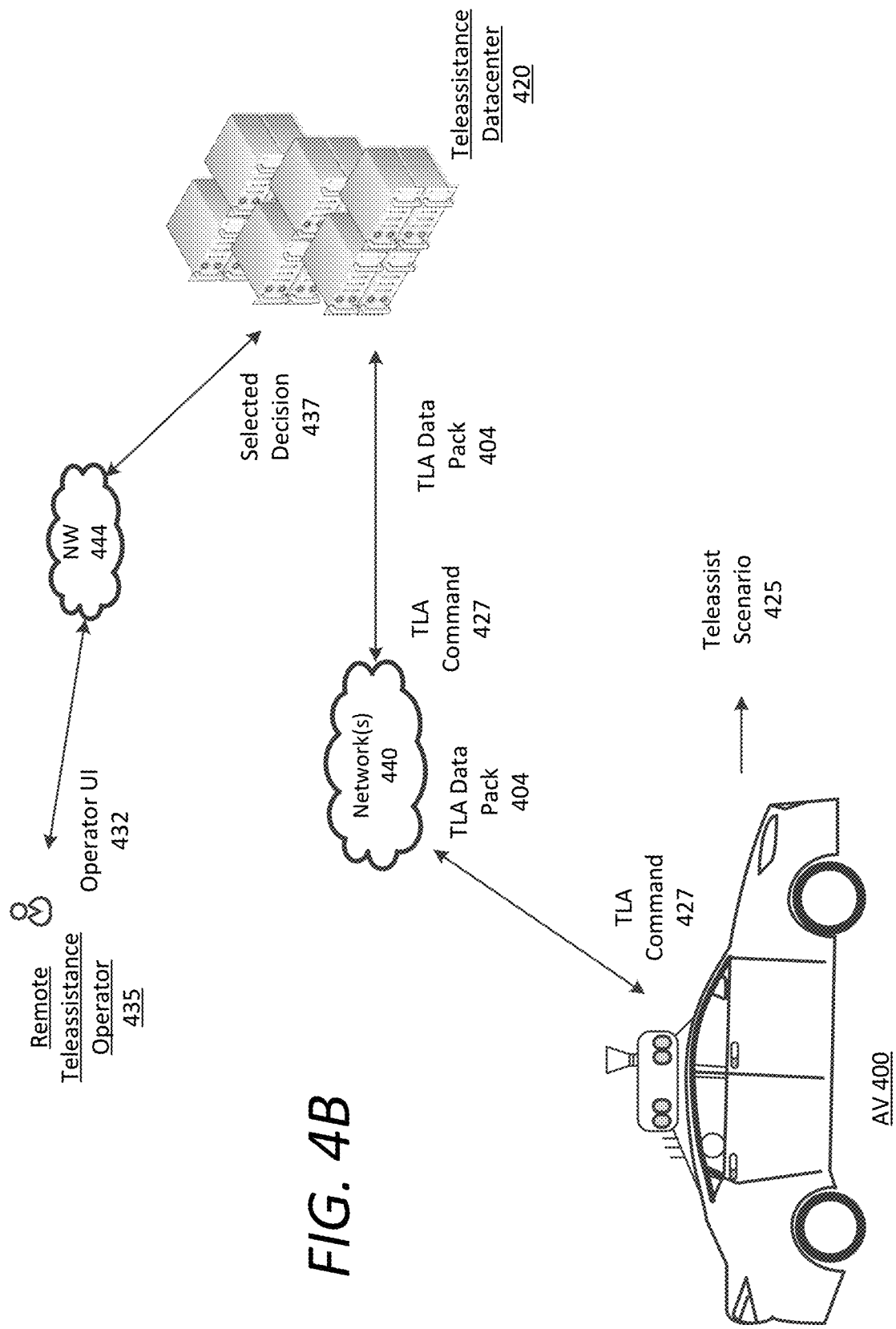

FIGS. 4A and 4B show an example autonomous vehicle initiating teleassistance after running a motion planning hierarchy, in accordance with example implementations. In the example shown in FIG. 4A, the AV 400 can travel along a current route according to a primary trajectory 418. As the AV 400 travels at velocity v1, the AV 400 can encounter a parked truck 408 that blocks a field of view 409 of the AV's 400 sensor suite 403. Since the sensor view is blocked—resulting in a potential collision with vehicle 414—the motion planner corresponding to the primary trajectory 418 can enter a teleassistance state, which can cause the AV 400 to revert to a secondary motion planner corresponding to a secondary trajectory 420. As shown in FIG. 4A, the secondary trajectory 420 can correspond to a right turn at the intersection around the parked truck 408.

However, the second trajectory 420 may also fail to meet a minimum safety threshold due to the AV 400 having to cross in front of the parked truck 408, resulting in a potentially dangerous situation. Thus, the secondary motion planner corresponding to the secondary trajectory 420 can also enter a teleassistance state. In the example shown in FIG. 4A, the AV 400 can implement a third motion planner corresponding to a tertiary trajectory 422. The tertiary trajectory 422 can correspond to a U-turn that avoids the intersection 407 and the occlusion caused by the parked truck 408. However, the tertiary trajectory 422 can cause a potential collision between the AV 400 and vehicle 416. Accordingly, third motion planner can also enter a teleassistance state, which can cause the AV 400 to slow to a stop in the road, and request remote teleassistance.

Referring to FIG. 4B, once all the motion planners failover to a teleassistance state due to the detected teleassistance scenario 425 (e.g., corresponding to the blocked field of view 409 and dangerous intersection 407 shown in FIG. 4A), the AV 400 can generate and transmit a teleassistance data pack 404 to a backend teleassistance datacenter 420 over one or more networks 440. As described herein, the teleassistance data center 420 can house the remote teleassistance system 190, 290 shown and described with respect to FIGS. 1 and 2. Accordingly the teleassistance datacenter 420 can process the teleassistance data pack 404 by generating an operator user interface 432 for display on the computing device of an available remote teleassistance operator 435.

As described herein, the remote operator 435 can be connected to the data center 420 through a network 444 that can comprise either a local or wide area network link. As further described herein, the remote operator 435 can view simulations of each decision option being executed by the AV 400 based on a generated virtual environment using the sensor data in the teleassistance data pack 404. The remote operator 435 may then make a selection, and data corresponding to the selected decision 437 can be transmitted back to the datacenter 420 over the network 444. Based on the selected decision 437, the datacenter 420 can generate teleassistance command 427 and transmit the teleassistance command 427 back to AV 400 over the one more networks 440. The AV 400 may then execute the teleassistance command 427 to resolve the teleassist scenario 425.

Methodology

Figure 5:
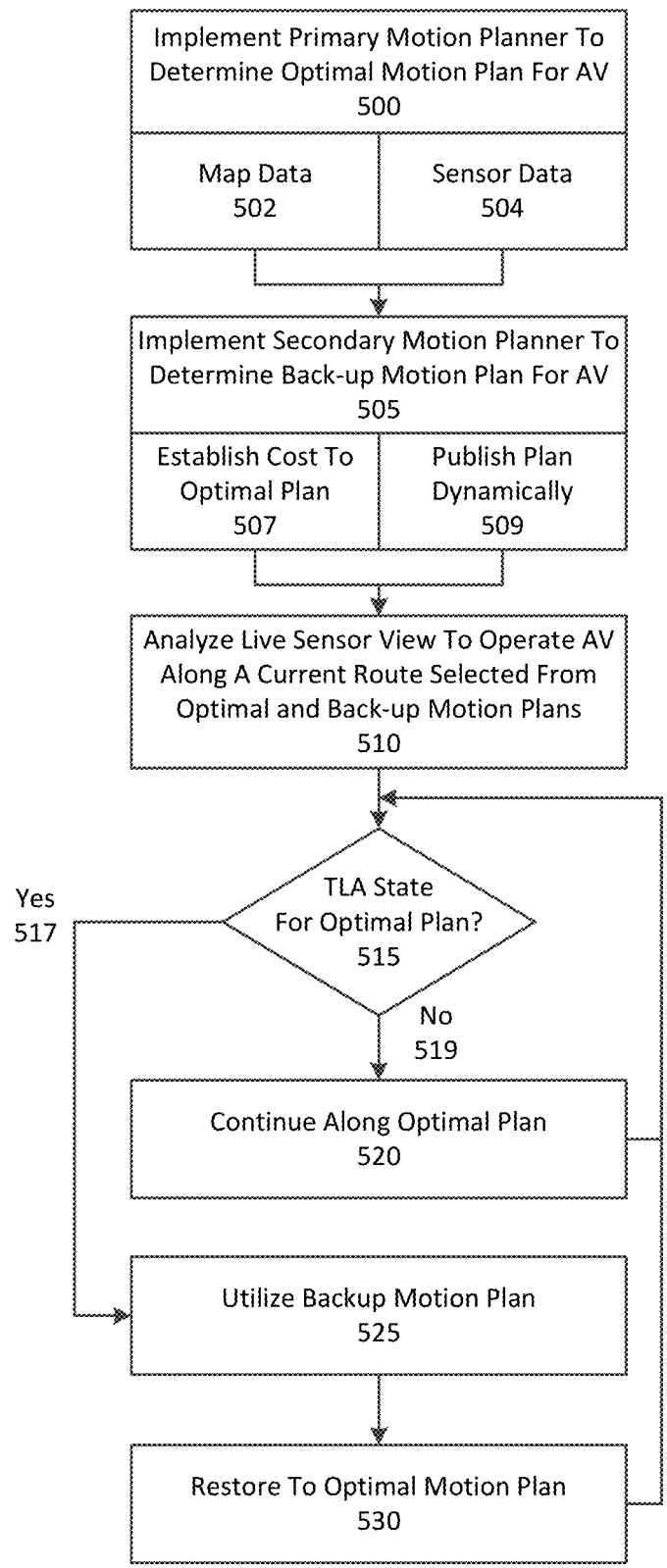
FIG. 5 is a flow chart describing an example method of operating an AV using multi-motion planning, according to examples described herein.

FIG. 5 is a flow chart describing an example method of operating an AV using multi-motion planning, according to examples described herein. In the below description of FIG. 5, reference may be made to reference characters representing like features as shown and described with respect to FIGS. 1 and 2. Furthermore the steps and processes described with respect to FIG. 5 may be performed by an example AV control system 120, 200 as shown and described with respect to FIGS. 1 and 2. Referring to FIG. 5, the AV control system 200 can implement a primary motion planner 215 to determine an optimal motion plan or trajectory 217 for the AV 100 along a current route 139 to a destination 137 (500). As described herein, the primary motion planner 215 can utilize map data (502) and/or sensor data 115 from the AV's 100 sensor suite 102 (504) in order to determine the most optimal motion plan. In various examples, the AV control system 200 can execute the most optimal motion plan 217 determined by the primary motion planner 215 by default.

In certain aspects, the AV control system 200 can further implement a secondary motion planner 225 to determine a backup or secondary motion plan 227 for the AV 100 (505). The secondary motion planner 225 can also analyze map data and or sensor data 115 to determine the back of motion plan 227. Furthermore, in determining the back of motion plan 227, the secondary motion planner 225 can establish a cost to the optimal motion plan 217 in order to ensure that the backup motion plan 227 divergence from the most optimal motion plan 217 (507). Still further, in some aspects, the secondary motion planner 225 can be triggered to execute in response to the primary motion planner 215 entering a teleassistance state, or the secondary motion planner 225 can publish the backup motion plan 227 dynamically (509).

The AV control system 200 can analyze live sensor view generated by the AV's 100 sensor suite 102 in order to operate the AV 100 along a current route plan 139 selected from the optimal motion plan 215 and the backup motion plan 227 (510). In doing so, the AV control system 200 can determine whether the primary motion planner 215, corresponding to the most optimal motion plan 217, has entered a teleassistance state (515). As described here in the teleassistance state can correspond to the most optimal motion plan 217 requiring remote human assistance (e.g., a safety threshold not being met). If the primary motion planner 215 is not in a teleassistance state (519), then the AV control system 200 can continue along optimal motion plan 217 (520).

However, if the primary motion plan is in a teleassistance state (517), then AV control system 200 can utilize the backup motion plan 227 (525). As described herein, after executing the backup motion plan 227, the AV control system 200 can then restore to the optimal motion plan 217 (530). Thereafter, the process can continue cycling their decision block (515) until the AV 100 arrives at its destination 137.

Figure 6:
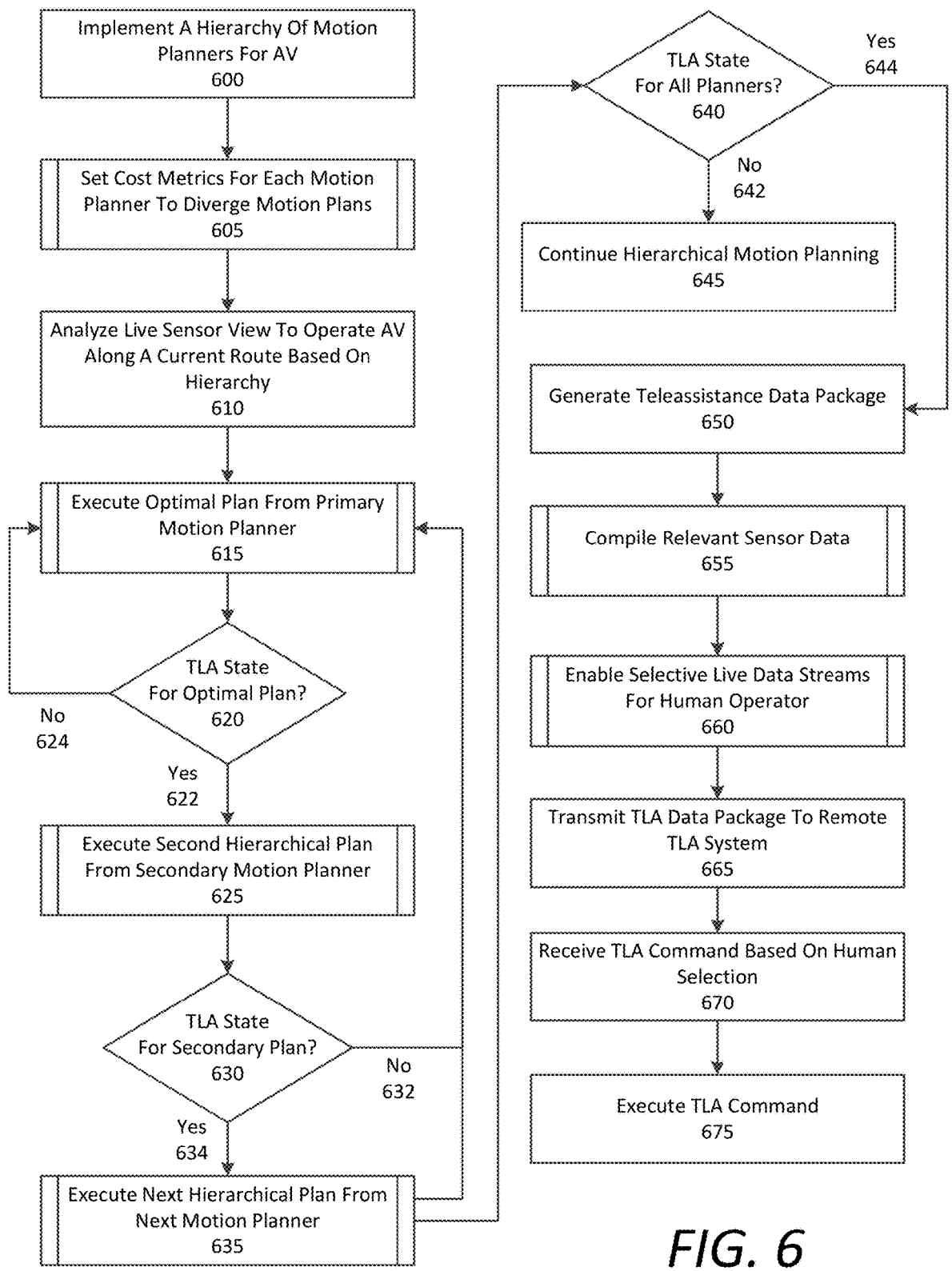
FIG. 6 is flow chart describing an example method of implementing hierarchical motion planning and teleassistance, according to examples described herein.

FIG. 6 is flow chart describing an example method of implementing hierarchical motion planning and teleassistance, according to examples described herein. In the below description of FIG. 6, reference may also be made to reference characters representing like features as shown and described with respect to FIGS. 1 and 2. Furthermore the low-level processes described respect to FIG. 6 may also be performed by an AV control system 120, 200 as shown and described with respect to FIGS. 1 and 2. Referring to FIG. 6, the control system 200 can implement a hierarchy of motion planners 215, 225, 235 for the AV 100 (600). In implementing the hierarchy, the AV control system 200 can set cost metrics for each motion planner to ensure that a subsequent motion planner diverges from a previous motion planner (605). For example, the primary motion planner 215 can execute with no cost metrics to continuously identify the most optimal motion plan 217. The secondary motion planner 225 can execute with an established cost for following the most optimal motion plan 217 in order to determine the backup motion plan 227. The tertiary motion planner can execute with established cost for both most optimal motion plan 217 and the backup motion plan 227 to determine a tertiary motion plan—and onwards down the hierarchy.

In various examples, the AV control system 200 can analyze the live sensor view of the AV 100 to operate the AV 100 along current route 139 based on the hierarchy of motion planners (610). In doing so, the AV control system 200 can execute the most optimal motion plan 217 from the primary motion planner 215 by default (615). As described herein, the AV control system 200 can determine whether the most optimal motion plan 217 is in a teleassistance state requiring remote human assistance (620). If not (624), the AV control system 200 can continue to execute the optimal motion plan 217 from the primary motion planner 215 (615). However, if the primary motion planner 215 has entered a teleassistance state (622), the AV control system 200 can execute a second hierarchical motion plan 227 generated by the secondary motion planner 225 (625).

In doing so, the AV control system 200 can determine whether the secondary motion plan 227 is in a teleassistance state (630). If not (632), then upon executing the second motion plan 227, the AV control system 200 can revert back optimal motion plan 217 (615), resetting the hierarchy. However, if both the optimal motion plan 217 and the secondary motion plan 227 require human teleassistance (634), then the AV control system 200 can execute the next hierarchical motion plan 237 from a next motion planner 235 in the hierarchy (635). After executing the next hierarchical motion plan 237, 80 control system 200 can revert back to the most optimal motion plan 217 (615), resetting the hierarchy.

At decision block (640), the AV control system 200 can determine whether a teleassistance state exists for all motion planners 215, 225, 235 in the hierarchy. If not (642), then AV control system 200 will continue hierarchical motion planning by executing a highest priority motion plan that is not in a teleassistance state (645). However, if the teleassistance state exists for all motion planners 215, 225, 235 (644), then AV control system 200 can generate a teleassistance package 256 in order to request remote human assistance (650). In doing so, the AV control system 200 can compile relevant sensor data 115 (655) and enable selective live data streams for the human operator 295 (660). For example, the data pack 256 can enable the remote operator 295 to select individual video feeds from individual cameras, and/or view simulations of each motion plan or decision option being executed by the AV 100.

the AV control system 200 may then transmit the data pack 256 to the remote teleassistance system 290 (665), which can provide an operator user interface 293 to an available remote operator 295 accordingly. Upon the human operator 295 making a selection 296, the remote teleassistance system 290 can generate a teleassistance command 299 corresponding to the selection 296. The AV control system 200 may then receive the teleassistance command 299 (670), and execute the command 299 (675), as described herein.

Hardware Diagrams

Figure 7:
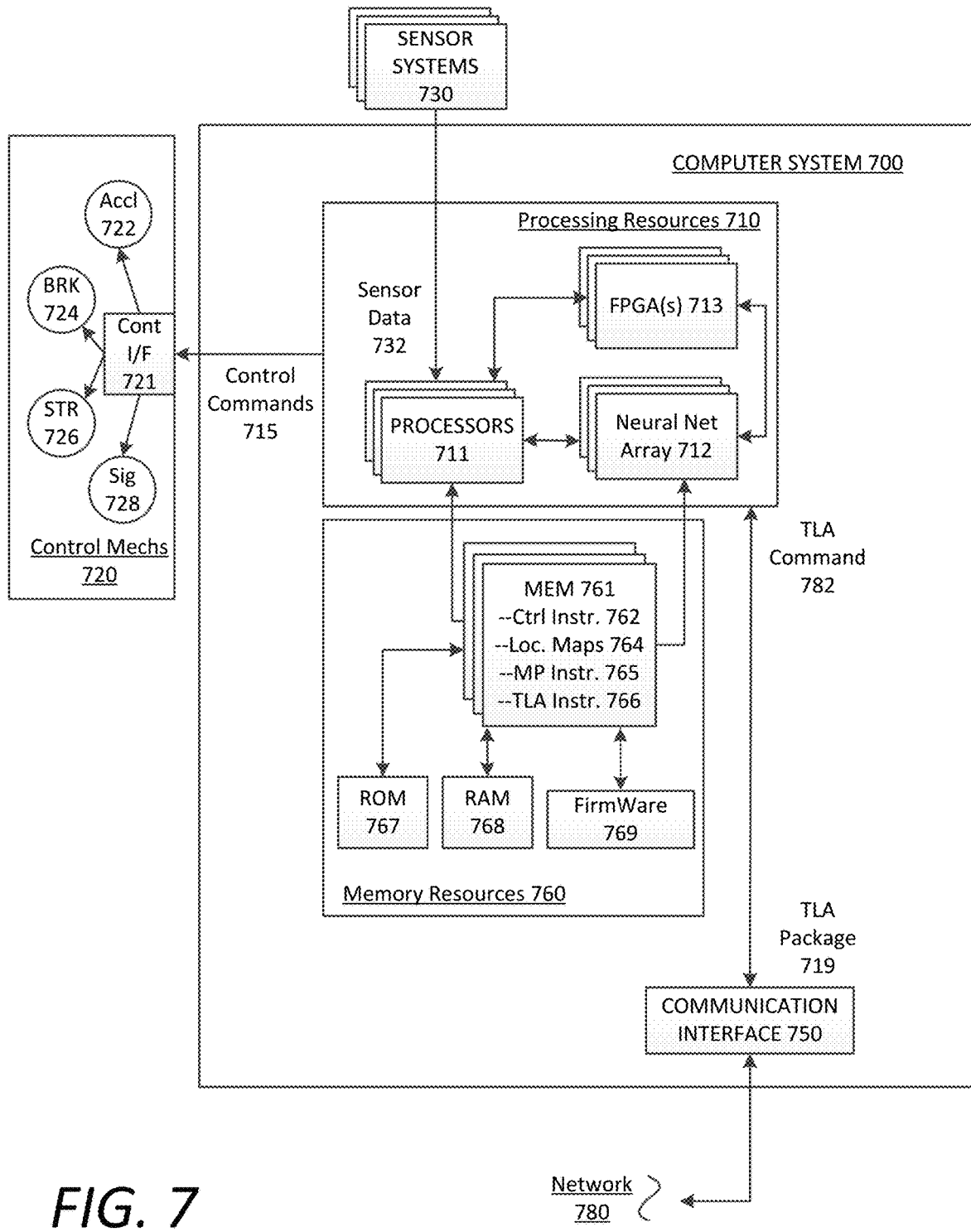
FIG. 7 is a block diagram illustrating a computer system for an autonomous vehicle upon which examples described herein may be implemented.

FIG. 7 is a block diagram illustrating a computer system upon which example AV processing systems described herein may be implemented. The computer system 700 can be implemented using a number of processing resources 710, which can comprise processors 711, field programmable gate arrays (FPGAs) 713. In some aspects, any number of processors 711 and/or FPGAs 713 of the computer system 700 can be utilized as components of a neural network array 712 implementing a machine learning model and utilizing road network maps stored in memory 761 of the computer system 700. In the context of FIGS. 1 and 2, various aspects and components of the AV control system 120, 200, can be implemented using one or more components of the computer system 700 shown in FIG. 7.

According to some examples, the computer system 700 may be implemented within an autonomous vehicle (AV) with software and hardware resources such as described with examples of FIGS. 1 and 2. In an example shown, the computer system 700 can be distributed spatially into various regions of the AV, with various aspects integrated with other components of the AV itself. For example, the processing resources 710 and/or memory resources 760 can be provided in a cargo space of the AV. The various processing resources 710 of the computer system 700 can also execute control instructions 762 using microprocessors 711, FPGAs 713, a neural network array 712, or any combination of the same.

In an example of FIG. 7, the computer system 700 can include a communication interface 750 that can enable communications over a network 780. In one implementation, the communication interface 750 can also provide a data bus or other local links to electro-mechanical interfaces of the vehicle, such as wireless or wired links to and from control mechanisms 720 (e.g., via a control interface 721), sensor systems 730, and can further provide a network link to a backend transport management system or a remote teleassistance system (implemented on one or more datacenters) over one or more networks 780.

The memory resources 760 can include, for example, main memory 761, a read-only memory (ROM) 767, storage device, and cache resources. The main memory 761 of memory resources 760 can include random access memory (RAM) 768 or other dynamic storage device, for storing information and instructions which are executable by the processing resources 710 of the computer system 700. The processing resources 710 can execute instructions for processing information stored with the main memory 761 of the memory resources 760. The main memory 761 can also store temporary variables or other intermediate information which can be used during execution of instructions by the processing resources 710. The memory resources 760 can also include ROM 767 or other static storage device for storing static information and instructions for the processing resources 710. The memory resources 760 can also include other forms of memory devices and components, such as a magnetic disk or optical disk, for purpose of storing information and instructions for use by the processing resources 710. The computer system 700 can further be implemented using any combination of volatile and/or non-volatile memory, such as flash memory, PROM, EPROM, EEPROM (e.g., storing firmware 769), DRAM, cache resources, hard disk drives, and/or solid state drives.

The memory 761 may also store localization maps 764 in which the processing resources 710—executing the control instructions 762—continuously compare to sensor data 732 from the various sensor systems 730 of the AV. Execution of the control instructions 762 can cause the processing resources 710 to generate control commands 715 in order to autonomously operate the AV's acceleration 722, braking 724, steering 726, and signaling systems 728 (collectively, the control mechanisms 720). On a lower level, the memory 761 can store motion planning instructions 765 executable by the processing resources 710 to simultaneously generate a hierarchical set of motion plans, as described herein. Thus, in executing the control instructions 762 and motion planning instructions 765, the processing resources 710 can receive sensor data 732 from the sensor systems 730, dynamically compare the sensor data 732 to a current localization map 764, and generate control commands 715 for operative control over the acceleration, steering, and braking of the AV along a particular motion plan. The processing resources 710 may then transmit the control commands 715 to one or more control interfaces 722 of the control mechanisms 720 to autonomously operate the AV through road traffic on roads and highways, as described throughout the present disclosure.

The memory 761 may also store teleassistance instructions 766 that the processing resources 710 can execute to identify detection or object anomalies when all motion planners enter a teleassistance state, transmit teleassistance data packages 719 to a backend teleassistance system over the network 780, and receive teleassistance commands 782 in return. Execution of the instructions 762, 764, 765, 766 can cause the processing resources 710 to process the teleassistance commands 782 accordingly to resolve the detected teleassistance state. Thereafter, the processing resources 710 can generate control commands 715 to cause the control mechanisms 720 to autonomously operate the AV along the current route or an alternate route accordingly.

Figure 8:
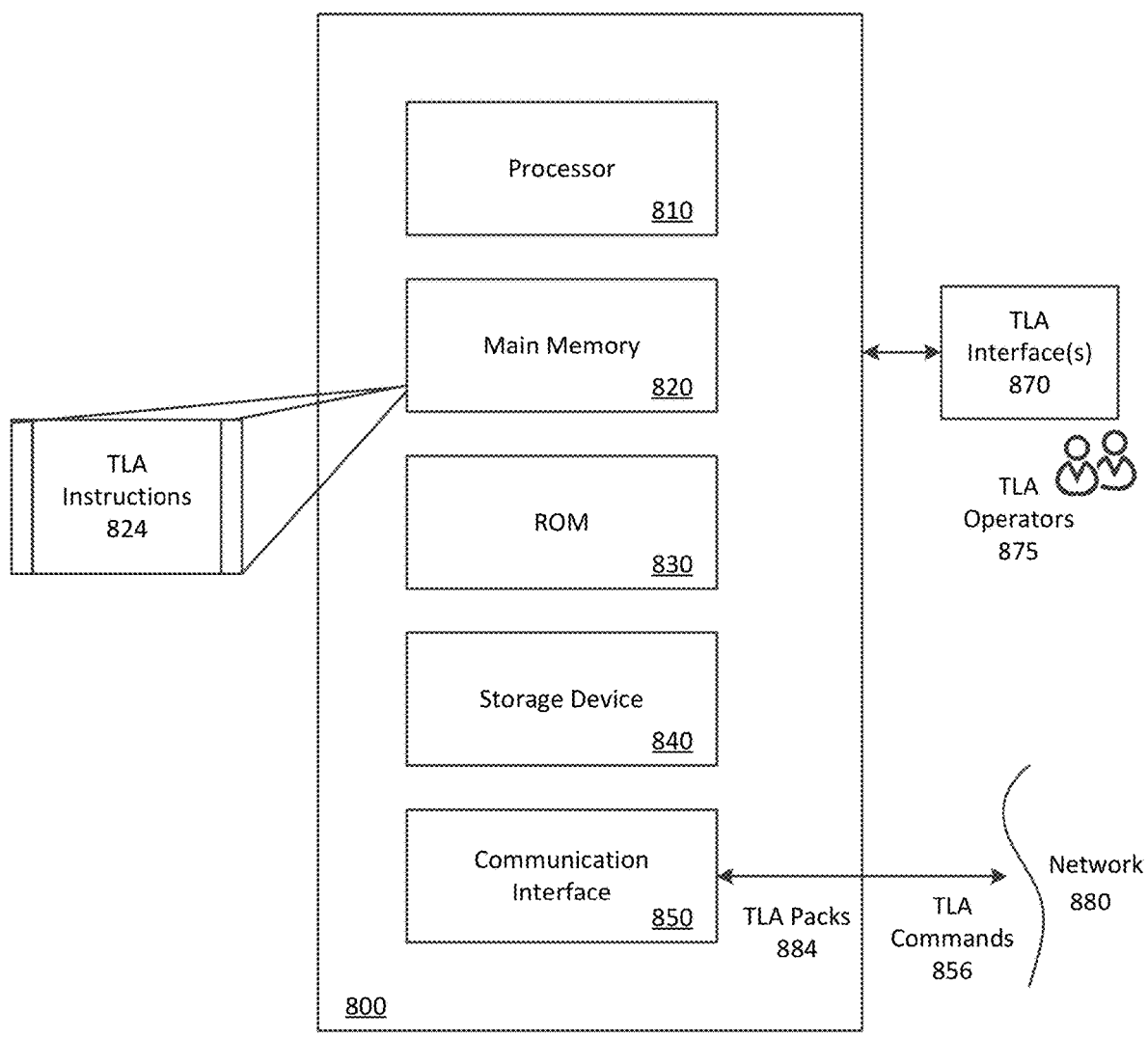
FIG. 8 is a block diagram illustrating a computer system for a backend datacenter upon which example transport systems described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service for providing transportation services. In the context of FIGS. 1 and 2, the teleassistance system 190, 290 may be implemented using a computer system 800 such as described by FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate over one or more networks 880 (e.g., cellular network) through use of the network link (wireless or wired). Using the network link, the computer system 800 can communicate with one or more computing devices, one or more servers, and/or one or more autonomous vehicles. The executable instructions stored in the memory 820 can include teleassistance instructions 824, which enables the computer system 800 to receive teleassistance data packages 884 from AVs operating throughout the given region. In some aspects, execution of the teleassistance instructions 824 can cause the computer system 800 to automatically generate a teleassistance command 856. In addition or as a variation, the computer system 800 can transmit the teleassistance data packages 884 over one or more teleassistance interfaces 870 to human teleassistance operators 875, which can cause the teleassistance commands 856 to be generated and then transmitted back to the AVs in order to resolve teleassistance states or scenarios.

The processor 810 is configured with software and/or other logic to perform one or more processes, steps and other functions described with implementations, such as described with respect to FIGS. 1-6, and elsewhere in the present application. Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. An autonomous vehicle (AV) comprising:
a sensor suite generating a live sensor view of a surrounding environment of the AV;
acceleration, braking, and steering systems; and
a control system executing an instruction set, causing the control system to:
implement a primary motion planner to continuously determine a first motion plan for the AV;
implement a secondary motion planner to continuously determine a backup motion plan for the AV, wherein continuously determining a backup plan comprises:
identifying an upcoming route trajectory associated with the first motion plan; and
dynamically adjusting one or more cost metrics associated with following the upcoming route trajectory associated with the first motion plan to cause the backup motion plan to diverge from the first motion plan, wherein the one or more cost metrics comprise a threshold below which the secondary motion planner will determine the backup motion plan to be different from the first motion plan, and above which the backup motion plan and the first motion plan will be the same; and
analyze the live sensor view to operate the acceleration, braking, and steering systems along sequential route trajectories selected between the first motion plan and the backup motion plan by selecting the backup motion plan, the backup motion plan preventing the primary motion planner from triggering a first teleassistance state for the first motion plan, the first teleassistance state corresponding to the primary motion planner requesting human assistance to continue in accordance with the first motion plan.

2. The AV of claim 1, wherein the executed instruction set further causes the control system to:
determine a second teleassistance state in which the secondary motion planner requires remote human assistance to continue; and
transmit a teleassistance data package to a remote teleassistance system to enable human selection between the first motion plan and the backup motion plan.

3. The AV of claim 2, wherein the teleassistance data package provides sensor data from the live sensor view utilized to generate a virtual simulation of each of the first motion plan and the backup motion plan for a human teleassistance operator to make a selection between the first motion plan and the backup motion plan.

4. The AV of claim 3, wherein the executed instruction set further causes the control system to:
receive a teleassistance command corresponding to the selection by the human teleassistance operator; and
execute the teleassistance command to resolve the second teleassistance state.

5. The AV of claim 1, wherein the primary motion planner and the secondary motion planner are included in a hierarchical set of motion planners simultaneously implemented by the control system.

6. A non-transitory computer readable medium storing instructions that, when executed by one or more processors of an autonomous vehicle (AV), cause the one or more processors to:
implement a primary motion planner to continuously determine a first motion plan for the AV;
implement a secondary motion planner to continuously determine a backup motion plan for the AV, wherein continuously determining a backup plan comprises:
identifying an upcoming route trajectory associated with the first motion plan; and
dynamically adjusting one or more cost metrics associated with following the upcoming route trajectory associated with the first motion plan to cause the backup motion plan from the first motion plan, wherein the one or more cost metrics comprise a threshold below which the secondary motion planner will determine the backup motion plan to be different from the first motion plan, and above which the backup motion plan and the first motion plan will be the same; and analyze a live sensor view generated by a sensor suite of the AV to operate acceleration, braking, and steering systems of the AV along sequential route trajectories selected between the first motion plan and the backup motion plan by selecting the backup motion plan, the backup motion plan preventing the primary motion planner from triggering a first teleassistance state for the first motion plan, the first teleassistance state corresponding to the primary motion planner requesting human assistance to continue in accordance with the first motion plan.

7. The non-transitory computer readable medium of claim 6, wherein the executed instructions further cause the one or more processors to:

determine a second teleassistance state in which the secondary motion planner requires remote human assistance to continue; and transmit a teleassistance data package to a remote teleassistance system to enable human selection between the first motion plan and the backup motion plan.

8. The non-transitory computer readable medium of claim 7, wherein the teleassistance data package provides sensor data from the live sensor view utilized to generate a virtual simulation of each of the first motion plan and the backup motion plan for a human teleassistance operator to make a selection between the first motion plan and the backup motion plan.

9. The non-transitory computer readable medium of claim 8, wherein the executed instructions further cause the one or more processors to:

receive a teleassistance command corresponding to the selection by the human teleassistance operator; and execute the teleassistance command to resolve the second teleassistance state.

10. The non-transitory computer readable medium of claim 6, wherein the primary motion planner and the secondary motion planner are included in a hierarchical set of motion planners simultaneously implemented by the AV.

11. A computer-implemented method of operating an autonomous vehicle (AV), the method being performed by one or more processors and comprising:

implementing a primary motion planner to continuously determine a first motion plan for the AV;

implementing a secondary motion planner to continuously determine a backup motion plan for the AV, wherein continuously determining a backup motion plan comprises:

identifying an upcoming route trajectory associated with the first motion plan; and dynamically adjusting one or more cost metrics associated with following the upcoming route trajectory associated with the first motion plan to cause the backup motion plan to diverge from the first motion plan, wherein the one or more cost metrics comprise a threshold below which the secondary motion planner will determine the backup motion plan to be different from the first motion plan, and above which the backup motion plan and the first motion plan will be the same; and analyzing a live sensor view generated by a sensor suite of the AV to operate acceleration, braking, and steering systems of the AV along sequential route trajectories selected between the first motion plan and the backup motion plan by selecting the backup motion plan, the backup motion plan preventing the primary motion planner from triggering a first teleassistance state for the first motion plan, the first teleassistance state corresponding to the primary motion planner requesting human assistance to continue in accordance with the first motion plan.

12. The method of claim 11, further comprising:

determining a second teleassistance state in which the secondary motion planner requires remote human assistance to continue; and transmitting a teleassistance data package to a remote teleassistance system to enable human selection between the first motion plan and the backup motion plan.

13. The method of claim 12, wherein the teleassistance data package provides sensor data from the live sensor view utilized to generate a virtual simulation of each of the first motion plan and the backup motion plan for a human teleassistance operator to make a selection between the first motion plan and the backup motion plan.

14. The method of claim 13, further comprising:

receiving a teleassistance command corresponding to the selection by the human teleassistance operator; and executing the teleassistance command to resolve the second teleassistance state.

* * * * *